March 5, 1929.  O. T. BLATHY  1,704,589
ROTATING FIELD MAGNET FOR TURBOGENERATORS
Filed Jan. 14, 1927
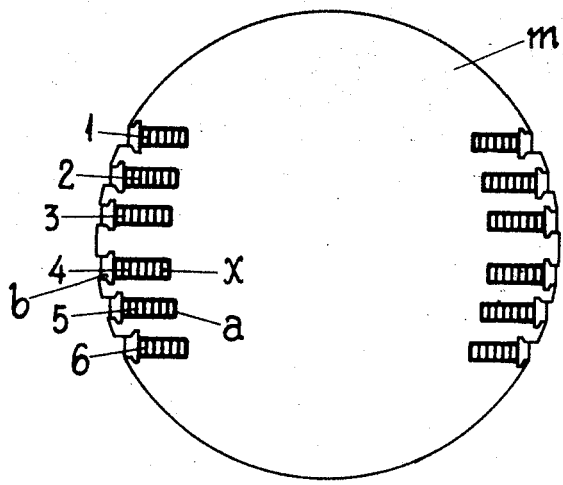
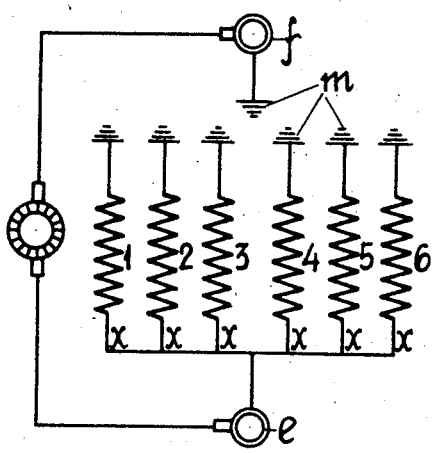
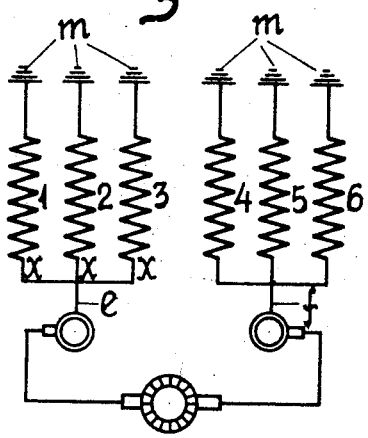
INVENTOR
Otto T. Blathy Patented Mar. 5, 1929.

1,704,589

UNITED STATES PATENT OFFICE.

OTTO TITUS BLÁTHY, OF BUDAPEST, HUNGARY.

ROTATING FIELD MAGNET FOR TURBOGENERATORS.

Application filed January 14, 1927, Serial No. 161,212, and in Hungary April 10, 1926.

The invention relates to a rotating field magnet for turbogenerators in which the field winding consists of more than two coils wound of bare metal strip and placed in slots of the iron magnet core, said slots being closed by metal wedges.

According to the invention the field coils are connected in multiple at their inner ends and conveniently each half of the number of coils is connected to a common line conductor, so that the outer ends of all the coils can be in electroconductive contact with the iron core of the field magnet.

In the drawing

Figure 1 shows a two-pole field magnet according to the invention in cross section, and Figures 2 and 3 show two circuit diagrams of a rotating field magnet comprising six field coils.

According to Figure 1, the field winding consists of coils 1–6 which are wound of bare metal strips and are arranged in slots of the iron core $m$, with insulating layers $a$ separating the coils from the inner surface of the slot. The coils are maintained in the slots by means of metallic wedges $b$ arranged so as to close the slots.

The coils 1–6 (Figure 2) are connected in multiple at their inner ends adjacent to the bottom of the slots and are connected to one common line conductor $e$, while the other ends of all the coils are in electroconductive contact with the iron core $m$ of the field magnet. The body of the iron core $m$ is connected to the second line conductor $f$.

The above arrangement allows to reduce the thickness of the insulation $a$ substantially, while no insulation is necessary between the wedges $b$ and the outermost turn of the coils as this latter can be in electroconductive contact with the iron core $m$. Hence the transfer of heat from the coils to the iron core is facilitated so that owing to the more efficient cooling of the coils, the load-capacity of the winding is considerably increased. Owing to the reduction of the thickness and the partial omission of the insulation the space available for the conductors within the slots is increased. The lack of the outermost layer of insulation enables the magnet to remain substantially completely operative even after a stator fire, since such fire damages only the outside layer of insulation.

A more convenient arrangement is shown in Figure 3, in which half of the number of coils, 1, 2, 3 and 4, 5, 6 respectively are connected in multiple at their inner ends $x$ by means of a common line conductor $e$ or $f$ respectively, while the outer ends of the coils are in electroconductive contact with the iron core $m$.

Having now particularly described and ascertained the nature of my said invention and in what manner the same is to be performed, I declare that what I claim is:—

1. In a rotating field magnet for turbo generators, an iron core, two collector rings connected therewith, a plurality of slots in said iron core, coils wound of metal strips of the breadth of the slots within said slots, metallic wedges closing the circumferential openings of said slots to secure said coils in said slots, means connecting said coils at one of their turns in multiple and with one of said collector rings, said coils being by means of the outermost turns substantially at the whole broader face of said outermost turn in metallic contact with said iron core.

2. In a rotating field magnet for turbo generators, an iron core, two collector rings connected therewith, a plurality of slots in said iron core, coils wound of metal strips of the breadth of the slots within said slots, metallic wedges closing the circumferential openings of said slots to secure said coils in said slots, all of said coils being connected in multiple and to one collector ring at their one outermost turn the other outermost winding of the coils being in metallic contact with the iron core and this latter in conductive connection with the other collector ring.

3. In a rotating field magnet for turbo generators, an iron core, two collector rings connected therewith, a plurality of slots in said iron core, coils wound of metal strips of the breadth of the slots within said slots, metallic wedges closing the circumferential openings of said slots to secure said coils in said slots, part of said coils being connected in multiple and to one collector ring at one of their turns, the remaining coils being connected in multiple and to the other collector ring at one of their turns, and all coils being by means of the outermost turn in metallic contact with said iron core.

4. In a rotating field magnet for turbo-generators, an iron core, two collector rings connected therewith, a plurality of slots in said iron core, coils wound of metal strips of the breadth of the slots within said slots, metallic wedges closing the circumferential openings of said slots to secure said coils in said slots, part of said coils being connected in multiple and to one collector ring at one of their outermost turns, the remaining coils being connected in multiple and to the other collector ring at one of their outermost turns, and all coils being by means of the other outermost turn in metallic contact with said iron core.

In testimony whereof I affix my signature.

OTTO TITUS BLÁTHY.